US011164034B2

(12) United States Patent
Huang et al.

(10) Patent No.: US 11,164,034 B2
(45) Date of Patent: Nov. 2, 2021

(54) IMAGE ANALYSIS APPARATUS AND IMAGE ANALYSIS METHOD (71) Applicant: Institute For Information Industry, Taipei (TW)

(72) Inventors: Mao-Chi Huang, Taipei (TW); Chih-Hsiang Ho, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 106 days.

(21) Appl. No.: 16/709,653

(22) Filed: Dec. 10, 2019

(65) Prior Publication Data
US 2021/0174126 A1    Jun. 10, 2021

(30) Foreign Application Priority Data

Dec. 9, 2019 (TW) ................. 108144943

(51) Int. Cl.
G06K 9/46 (2006.01)
G06T 7/13 (2017.01)
G06T 7/90 (2017.01)

(52) U.S. Cl.
CPC ......... *G06K 9/4642* (2013.01); *G06K 9/4652* (2013.01); *G06T 7/13* (2017.01); *G06T 7/90* (2017.01)

(58) Field of Classification Search
CPC .. G06K 9/4642; G06K 9/4652; G06K 9/6202; G06K 9/6279; G06K 9/00228; G06T 7/13; G06T 7/90; G06T 7/001; G06T 7/593; G06T 7/85; G06T 7/73; G06T 2207/10024; G06T 11/40; G06T 2207/20228; G06T 2207/30201; G06T 2207/10021; G06T 7/55; G06T 3/0068; G06T 15/04; A63F 13/327; A63F 13/213;
(Continued)

(56) References Cited

U.S. PATENT DOCUMENTS 9,686,481 B1    6/2017 Graybill et al.
2014/0009612 A1   1/2014 King

FOREIGN PATENT DOCUMENTS

EP    2270547 A2    1/2011
TW    I231918 B     5/2005
(Continued)

OTHER PUBLICATIONS

Office Action to the corresponding Taiwan Patent Application rendered by the Taiwan Intellectual Property Office (TIPO) dated Nov. 23, 2020, 7 pages (including English translation).

*Primary Examiner* — Duy M Dang
(74) *Attorney, Agent, or Firm* — CKC & Partners Co., LLC (57) ABSTRACT

An image analysis apparatus rectifies a first image and a second image to generate a first rectified image and a second rectified image respectively. A first container door in the first rectified image and a second container door in the second rectified image have the same sizes and the same pixel coordinates. The image analysis apparatus divides the first rectified image into a plurality of first blocks and divides the second rectified image into a plurality of second blocks in a same manner. The image analysis apparatus calculates respective correlations between every first block and its corresponding second block. Each of the correlations includes a grayscale correlation and at least one color correlation. The image analysis apparatus determines whether the first container door and the second container door represent the same container door based on the correlations.

8 Claims, 5 Drawing Sheets (58) Field of Classification Search
CPC ........ A63F 13/25; A63F 13/32; A63F 13/332;
A63F 13/335; A63F 13/655; A63F 13/00;
G01S 13/90; G01S 17/89; H04N 13/128;
H04N 13/194; H04N 2013/0081
See application file for complete search history.

(56) References Cited

FOREIGN PATENT DOCUMENTS

| | | | |
|---|---|---|---|
| TW | 201818298 A | 5/2018 | |
| WO | 2007122221 A1 | 11/2007 | |

IMAGE ANALYSIS APPARATUS AND IMAGE ANALYSIS METHOD

This application claims priority to Taiwan Patent Application No. 108144943 filed on Dec. 9, 2019, which is hereby incorporated by reference in its entirety.

CROSS-REFERENCES TO RELATED APPLICATIONS

Not applicable.

BACKGROUND

Technical Field

Embodiments of the present invention relate to an image analysis apparatus and an image analysis method. More specifically, embodiments of the present invention relate to an image analysis apparatus and an image analysis method for determining whether two container doors in two images represent the same container door through image analysis.

Description of Related Art

In order to determine whether an inbound container (i.e. the container after transport) is the same as an outbound container (i.e. the container before transport), most of the existing solutions are manually comparing the patterns of container door images of the outbound container and the inbound container by inspectors at the entry. However, in general, the efficiency and the accuracy of such manual inspections are not pretty acceptable. In few cases, some actions of the manual inspections may be replaced with ordinary computers, but the overall efficiency and accuracy are still not good because such ordinary computers are not capable of solely inspecting containers by themselves. Therefore, there is a problem of how to improve the efficiency and accuracy of the existing container inspection in the art.

SUMMARY

To solve at least the above problem, embodiments of the present invention provide an image analysis apparatus which may comprise a storage and a processor electrically connected to each other. The storage may be configured to store a first image and a second image, wherein the first image comprises a first container door, and the second image comprises a second container door. The processor may be configured to: rectify the first image and the second image to generate a first rectified image and a second rectified image, wherein the first container door in the first rectified image and the second container door in the second rectified image have same sizes and same pixel coordinates; divide the first rectified image into a plurality of first blocks and divide the second rectified image into a plurality of second blocks in a same manner; calculate respective correlations between every first block and its corresponding second block, wherein each of the plurality of correlations comprises a grayscale correlation and at least one color correlation; and determine whether the first container door and the second container door represent the same container door based on the plurality of correlations.

To solve at least the above problem, embodiments of the present invention also provide an image analysis method performed by an image analysis apparatus, which may comprise the following steps: rectifying a first image and a second image to generate a first rectified image and a second rectified image respectively, wherein the first container door in the first rectified image and the second container door in the second rectified image have same sizes and same pixel coordinates; dividing the first rectified image into a plurality of first blocks and dividing the second rectified image into a plurality of second blocks in a same manner; calculating respective correlations between every first block and its corresponding second block, wherein each of the plurality of correlations comprises a grayscale correlation and at least one color correlation; and determining whether the first container door and the second container door represent the same container door based on the plurality of correlations.

In the embodiments of the present invention, by rectifying the first image and the second image, it will be feasible to directly compare the first rectified image and the second rectified image on the same comparison basis and thus directly determine whether an inbound container and an outbound container represent the same container. Therefore, the embodiments of the present invention can accomplish higher inspection efficiency. On the other hand, in the process of comparing the first rectified image with the second rectified image, it is not necessary to calculate the difference between the two images, but instead to calculate the respective correlations between two corresponding blocks of the same position (i.e. one first block and its corresponding second block). Thereby, the local differences between the two images can be enhanced. In addition, because each of the correlations calculated for two corresponding blocks of the same position comprises a grayscale correlation and a color correlation, it can reflect the feature difference in more aspects (patterns, shapes, colors, and so on). Therefore, the embodiments of the present invention can also accomplish higher inspection accuracy.

What described above is not intended to limit the present invention, but merely outlines the technical problems that the present invention can solve, the technical means that can be adopted and the technical effects that can be achieved so that a person having ordinary skill in the art can preliminarily understand the present invention. According to the attached drawings and the description of the following embodiments, a person having ordinary skill in the art can further understand the details of various embodiments of the present invention.

BRIEF DESCRIPTION OF THE DRAWINGS

The attached drawings are provided for describing various embodiments, in which.

DETAILED DESCRIPTION

In the following description, the present invention will be explained with reference to embodiments thereof. However, these embodiments are not intended to limit the present invention to be implemented in the operations, environment, applications, structures, processes, or steps described in these embodiments. In the attached drawings, elements unrelated to the present invention are omitted from depiction but may be implied in the drawings; and dimensions of elements and proportional relationships among individual elements in the attached drawings are only exemplary examples but not intended to limit the present invention. Unless stated particularly, same (or similar) element symbols may correspond to same (or similar) elements in the following description. Unless stated particularly, the number of each element described hereinafter may be one or more while being implementable.

Terms used in the present disclosure are only for the purpose of describing embodiments and are not intended to limit the invention. Singular forms "a," "an," and "the" are intended to include the plural forms as well, unless the context clearly indicates otherwise. Terms such as "comprises" and/or "comprising" specify the presence of stated features, integers, steps, operations, elements, and/or components, but do not preclude the presence of one or more other features, integers, steps, operations, elements, components, and/or combinations thereof. The term "and/or" includes any and all combinations of one or more associated listed items.

Figure 1:
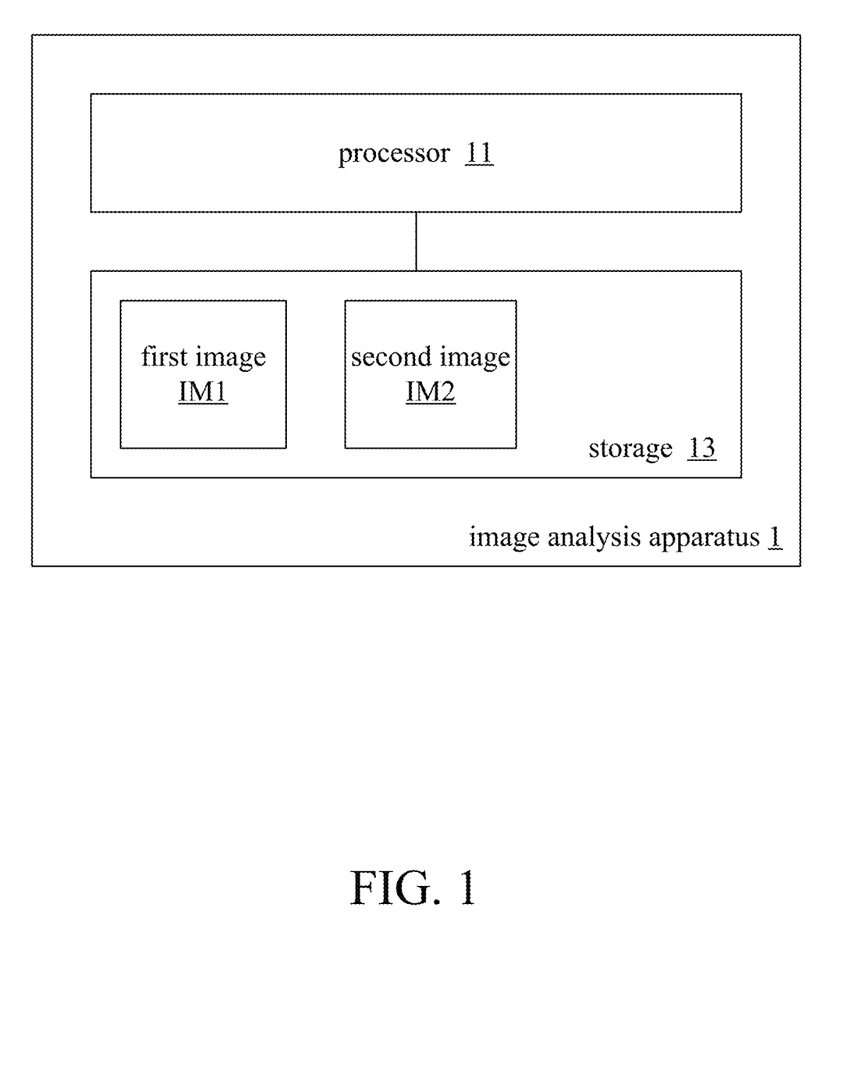
FIG. 1 illustrates an image analysis apparatus according to some embodiments of the present invention.

FIG. 1 illustrates an image analysis apparatus according to some embodiments of the present invention. The content of FIG. 1 is shown only for the purpose of illustrating embodiments of the present invention and is not intended to limit the present invention.

Referring to FIG. 1, the image analysis apparatus 1 may basically comprise a processor 11 and a storage 13 which are electrically connected (directly or indirectly) to each other. The image analysis apparatus 1 may be, for example but not limited to: a server, a notebook computer, a tablet computer, a desktop computer, or a mobile device.

The processor 11 may be various types of microprocessors or microcontrollers with signal processing functions. A microprocessor or a microcontroller is a programmable special integrated circuit with the ability to operate, store, output/input, etc., and may receive and process various coded instructions, thereby performing various logic operations and arithmetic operations and outputting corresponding operational results. For example, as described later, the processor 11 may be configured to generate two rectified images respectively based on the two images stored in the storage 13, and divide the two rectified images in the same manner. After dividing the two rectified images, the processor 11 may further calculate the respective correlations between every two corresponding blocks, and determine whether the first container door and the second container door appearing in the two images represent the same container door based on all of the block correlations.

The storage 13 may comprise a primary memory (which are also called a main memory or internal memory), which is directly connected with the processor 11. The processor 11 may read instruction sets stored in the primary memory, and execute these instruction sets if needed. The storage 13 may further comprise a secondary memory (which are also called an external memory or auxiliary memory), which is connected to the processor 11 through memory I/O channels and transmit data to the primary memory through a data buffer. For example, the secondary memory may be various types of hard disk drives, or CD drives. The storage 13 may further comprise a third-level storage device, which may be a plug and play (PnP) flash drive or a cloud storage. The storage 13 may store data generated by the image analysis apparatus 1 and various data inputted into the image analysis apparatus 1. For example, as described later, the storage 13 may be configured to store a plurality of images, and the plurality of images may comprise a first image IM1 and a second image IM2.

In some embodiments, in addition to the processor 11 and the storage 13, the image analysis apparatus 1 may further comprise an input unit, an output unit, and/or a networking unit. The input unit is configured to provide various input interfaces (such as text, sound, and/or image input interfaces), so that the image analysis apparatus 1 may receive data or instructions from an external device (such as a mouse, a keyboard, a microphone, and a touch screen). The output unit is configured to provide various output interfaces (such as text, sound, and/or image output interfaces), so that the image analysis apparatus 1 may output data or instructions to external devices (such as a speaker, a monitor, a touch screen). The networking unit is configured to provide various network interfaces (such as a wired network interface and/or a wireless network interface), so that the image analysis apparatus 1 may connect to other network devices through various networks (such as a wireless mobile network, a fiber net, or a Wi-Fi network).

Figure 2A:
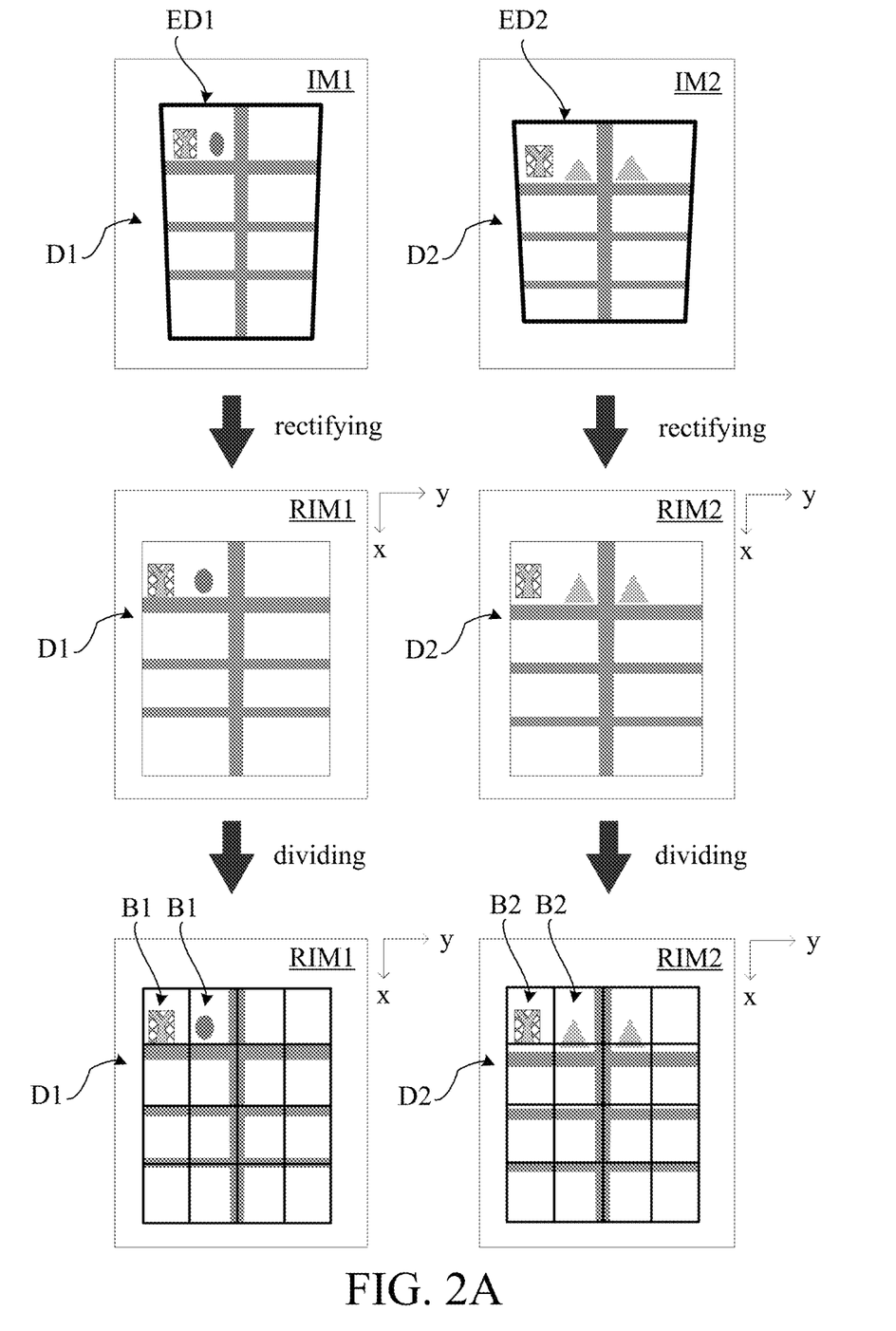
FIGS. 2A-2B illustrate how the image analysis apparatus of FIG. 1 analyze images.
Figure 2B:
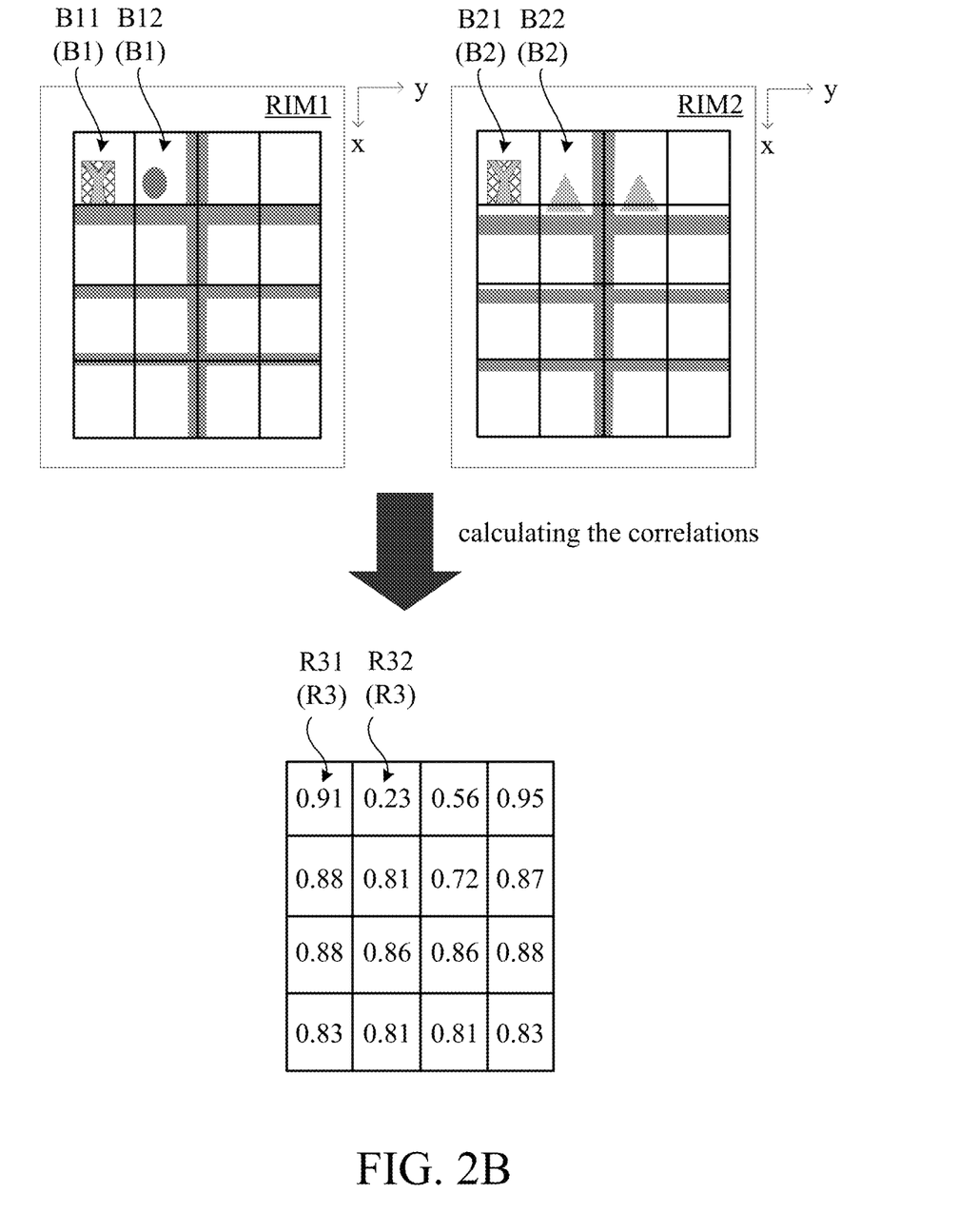
Figure 3:
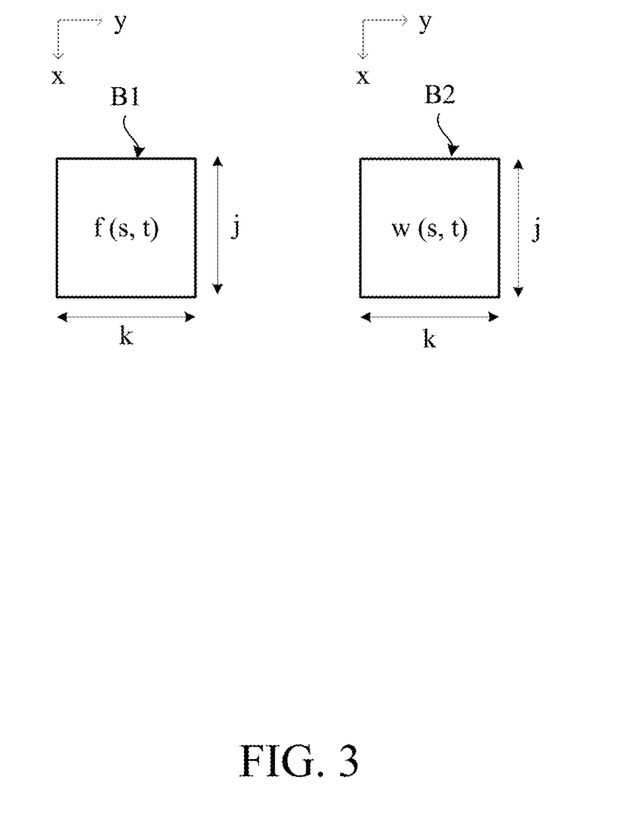
FIG. 3 is a schematic view illustrating a correlation calculation according to some embodiments of the present invention.

FIGS. 2A-2B illustrate how the image analysis apparatus of FIG. 1 analyze images, and FIG. 3 is a schematic view illustrating a correlation calculation according to some embodiments of the present invention. The contents of FIGS. 2A-2B and FIG. 3 are shown only for the purpose of illustrating embodiments of the present invention and not intended to limit the present invention. For example, the patterns of the first container door D1 and the second container door D2 presented in FIGS. 2A-2B are merely an illustration rather than a limitation, and the correlation values shown in FIG. 2B are merely an illustration rather than a limitation.

Referring to FIG. 2A, at first, the processor 11 may retrieve a first image IM1 and a second image IM2 from the storage 13, wherein the first image IM1 comprises a first container door D1 and the second image IM2 comprises a second container door D2. When the sizes and the pixel coordinates of the first container door D1 of the coordinate system of the first image IM1 and the second container door D2 of the second image IM2 are not the same, the processor 11 can rectify the first image IM1 and the second image IM2 stored in the storage 13 to generate a first rectified image RIM1 and a second rectified image RIM2 respectively, and thus make the first container door D1 of the first rectified image RIM1 and the second container door D2 of the second rectified image RIM2 have the same size and the same corresponding pixel coordinates. In addition, a two-dimensional coordinate (x-axis and y-axis) system can be used to define and represent the first rectified image RIM1 and the second rectified image RIM2.

In some embodiments, the processor 11 may identify edges ED1 of the first container door D1 from the first image IM1, and then rectify the first image IM1 according to the positions of the edges ED1 of the first container door D1. Similarly, the processor 11 may identify edges ED2 of the second container door D2 from the second image IM2, and rectify the second image IM2 according to the position of the edges ED2 of the second container door D2.

It will be described as for how the processor 11 rectifies the first image IM1 in detail. Based on the description, a person having ordinary skill in the art can also understand how the processor 11 rectifies the second image IM2.

For example, the processor 11 may respectively calculate the edges ED1 of the first container door D1 in the first image IM1 and the edges ED2 of the second container door D2 in the second image IM2 through the Sobel operator. In detail, the processor 11 may by the processor 11 may separately use the X-Direction Kernel and the Y-Direction Kernel to perform convolution operations on the first image IM1, and detect the edges ED1 of the container door in the first image IM1 according to the operation result. In the same manner, the processor 11 may detect the edges ED2 of the second container door D2 in the second image IM2. For example, the X-Direction Kernel and the Y-Direction Kernel may be expressed as follows:

$$X\text{-Direction Kernel} = \begin{bmatrix} -1 & 0 & 1 \\ -2 & 0 & 2 \\ -1 & 0 & 1 \end{bmatrix}$$

$$Y\text{-Direction Kernel} = \begin{bmatrix} -1 & -2 & -1 \\ 0 & 0 & 0 \\ 1 & 2 & 1 \end{bmatrix}$$

According to the edges ED1 and the edges ED2, the processor 11 may identify the first container door D1 from the first image IM1 and the second container door D2 from the second image IM2, respectively. After detecting the edges ED1 of the first container door D1 in the first image IM1, the processor 11 may rectify the first image IM1 according to the coordinates of the corners of the first container door D1 to generate the first rectified image RIM1. Similarly, after detecting the edges ED2 of the second container door D2 in the second image IM2, the processor 11 may rectify the second image IM2 according to the coordinates of the corners of the second container door D2 to generate the second rectified image RIM2. For example, the processor 11 may calculate the first rectified image RIM1 and the second rectified image RIM2 according to the following linear conversion formula:

$$\begin{cases} T_x(x, y) = c_1 + c_2 x + c_3 y + c_4 xy \\ T_y(x, y) = c_5 + c_6 x + c_7 y + c_8 xy \end{cases} \quad \text{(Formula 1)}$$

In Formula 1, (x,y) refers to an original coordinate of a pixel of the first image IM1/the second image IM2, and $(T_x(x,y), T_y(x,y))$ refers to the new coordinate of the same pixel after the first image IM1/the second image IM2 is rectified. The processor 11 may calculate the coefficients $c_1$, $c_2$, $c_3$, $c_4$, $c_5$, $c_6$, $c_7$, $c_8$ of Formula 1 based on the original coordinates (x,y) of pixels of the first container door D1 in the first image IM1 (for example, pixels on the edges ED1) and the predetermined coordinates $(T_x(x,y), T_y(x,y))$ of the corresponding pixels of the first rectified image RIM1 to be converted from the first image IM1, to establish a coordinate conversion rule for converting the first image IM1 to the first rectified image RIM1. In the above example, the number of coefficients in Formula 1 is eight, so the processor 11 will need to use at least eight pixels in the first image IM1 and eight corresponding preset pixels in the first rectified image RIM1 to establish the coordinate conversion rule. Similarly, the processor 11 can establish a coordinate conversion rule for converting the second image IM2 to the second rectified image RIM2. Then, the processor 11 may rectify the first image IM1 and the second image IM2 according to the abovementioned coordinate conversion rules to generate the first rectified image RIM1 and the second rectified image RIM2, respectively.

The first container door D1 in the first rectified image RIM1 and the second container door D2 in the second rectified image RIM2 have the same sizes and the same pixel coordinates. In other words, the first container door D1 in the first rectified image RIM1 and the second container door D2 in the second rectified image RIM2 have the same number of pixels, and the coordinate of each pixel of the first container door D1 in the first rectified image RIM1 completely corresponds to the coordinate of the corresponding pixel in the second rectified image RIM2.

After generating the first rectified image RIM1 and the second rectified image RIM2, the processor 11 divides the first rectified image RIM1 into a plurality of first blocks B1 and divides the second rectified image RIM2 into a plurality of second blocks B2 in a same manner. In detail, as shown in FIG. 2A, the processor 11 respectively divides the first rectified image RIM1 and the second rectified image RIM2 into the first blocks B1 and the second blocks B2. The number of the first blocks B1 are the same as that of the second blocks B2, and each pair of the corresponding first block B1 and second block B2 have the same size. The number of blocks can be adjusted according to different needs, and it is not restricted by the contents shown in FIGS. 2A-2B.

After separately dividing the first rectified image RIM1 and the second rectified image RIM2, the processor 11 may calculate the respective correlations between every first block B1 and its corresponding second block B2, wherein every correlation may simply comprise a grayscale correlation, or may comprise a grayscale correlation and at least one color correlation.

In some embodiments, the processor 11 may calculate the respective correlations between every first block B1 in the first rectified image RIM1 and its corresponding second block B2 in the second rectified image RIM2 according to the following formula:

$$\gamma(s, t) = \frac{\sum_{s=0}^{k-1}\sum_{t=0}^{j-1} [w(s,t) - \overline{w}][f(s,t) - \overline{f}]}{\left\{\sum_{s=0}^{k-1}\sum_{t=0}^{j-1} [w(s,t) - \overline{w}]^2 [f(s,t) - \overline{f}]^2\right\}^{\frac{1}{2}}} \quad \text{(Formula 2)}$$

Taking FIG. 3 for example, the dimensions of the first block B1 and the second block B2 both are presented as k×j, f(s,t) represents the pixels of the first block B1 in the first rectified image RIM1, $\overline{f}$ is the average value of all pixels in the first block B1, w(s,t) represents the corresponding pixels of the second block B2 in the second rectified image RIM2, and $\overline{w}$ is the average value of all pixels in the second block B2. According to Formula 2, the processor 11 may calculate the respective correlations between every first block B1 and its corresponding second block B2.

In some embodiments, the pixels in the first rectified image RIM1 and the second rectified image RIM2 may be represented by only grayscale parameters, or by both grayscale parameters and color parameters. For example, the YCbCr color space can be used to represent the pixels in the first rectified image RIM1 and the second rectified image RIM2, where "Y", "Cb", and "Cr" respectively represents luminance, blue density offset, and red density offset. "Y" may represent the grayscale value of the pixel, and "Cb" value or "Cr" value may represent the color value of the pixel.

In the case where the YCbCr color space is used to represent the pixels in the first rectified image RIM1 and the second rectified image RIM2, all of the correlations calculated by the processor 11 for every first block B1 and its corresponding second block B2 also belong to the YCbCr color space. For example, when every pixel of a first block B1 and its corresponding second block B2 is represented by "Y", "Cb", and "Cr," the processor 11 may calculate a grayscale correlation related to "Y" and two color correlations related to "Cb" and "Cr", and then determine a final correlation between the first block B1 and its corresponding second block B2 based on the three correlations. In this example, the processor 11 may select the smallest one of the three correlations as the final correlation between the first block B1 and its corresponding second block B2. Alternatively, the processor 11 may determine an average value of the three correlations as the final correlation between the first block B1 and its corresponding second block B2.

In some embodiments, the pixels in the first corrected image RIM1 and the second corrected image RIM2 may also be represented by an RGB color space or a HSI color space, and the respective correlations between every first block B1 and its corresponding second block B2 may be calculated in such cases.

Next, referring to FIG. 2B, according to the above description, the processor 11 may calculate the respective correlations R3 between every first block B1 and its corresponding second block B2. For example, the processor 11 may calculate the correlation R31 between the first block B11 and its corresponding second block B21, and calculate the correlation R32 between the first block B12 and its corresponding second block B22, and so on. Each of the correlations R3 may be a value between "0" and "1." A higher value indicates a higher correlation (i.e. higher similarity) between the two blocks; on the contrary, a lower value indicates a lower correlation (i.e. lower similarity) between the two blocks. For example, because the contents of the first block B11 and the second block B21 are quite similar, the correlation R31 reaches "0.91", and because the contents of the first block B12 and the second block B22 are different (i.e., different patterns in shapes), the correlation R32 is "0.23."

After calculating the respective correlations R3 between every first block B1 and its corresponding second blocks B2, the processor 11 may determine whether the first container door D1 and the second container door D2 represent the same container door based on all of the correlations R3. In some embodiments, the processor 11 may set a correlation threshold for each of the plurality of first blocks B1, and determine whether the first container door D1 and the second container door D2 represent the same container door by comparing the plurality of correlations R3 with the correlation thresholds respectively. According to different applications, these correlation thresholds may be set by a same value or different values. For example, the processor 11 may set a same correlation threshold for all of the first blocks B1. In this case, if every correlation R3 is greater than the respective correlation threshold, the processor 11 determines that the first container door D1 and the second container door D2 represent the same container door; however if any of the correlations R3 is less than the corresponding correlation threshold, the processor 11 determines that the first container door D1 and the second container door D2 do not represent the same container door. For another example, the processor 11 may set different correlation thresholds for each first block B1 according to the importance (weight) of the first block B1. In such case, if every correlation R3 is greater than respective correlation threshold, the processor 11 determines that the first container door D1 and the second container door D2 represent the same container door; however if any of the correlations R3 is less than the corresponding correlation threshold, the processor 11 determines that the first container door D1 and the second container door D2 do not represent the same container door.

Figure 4:
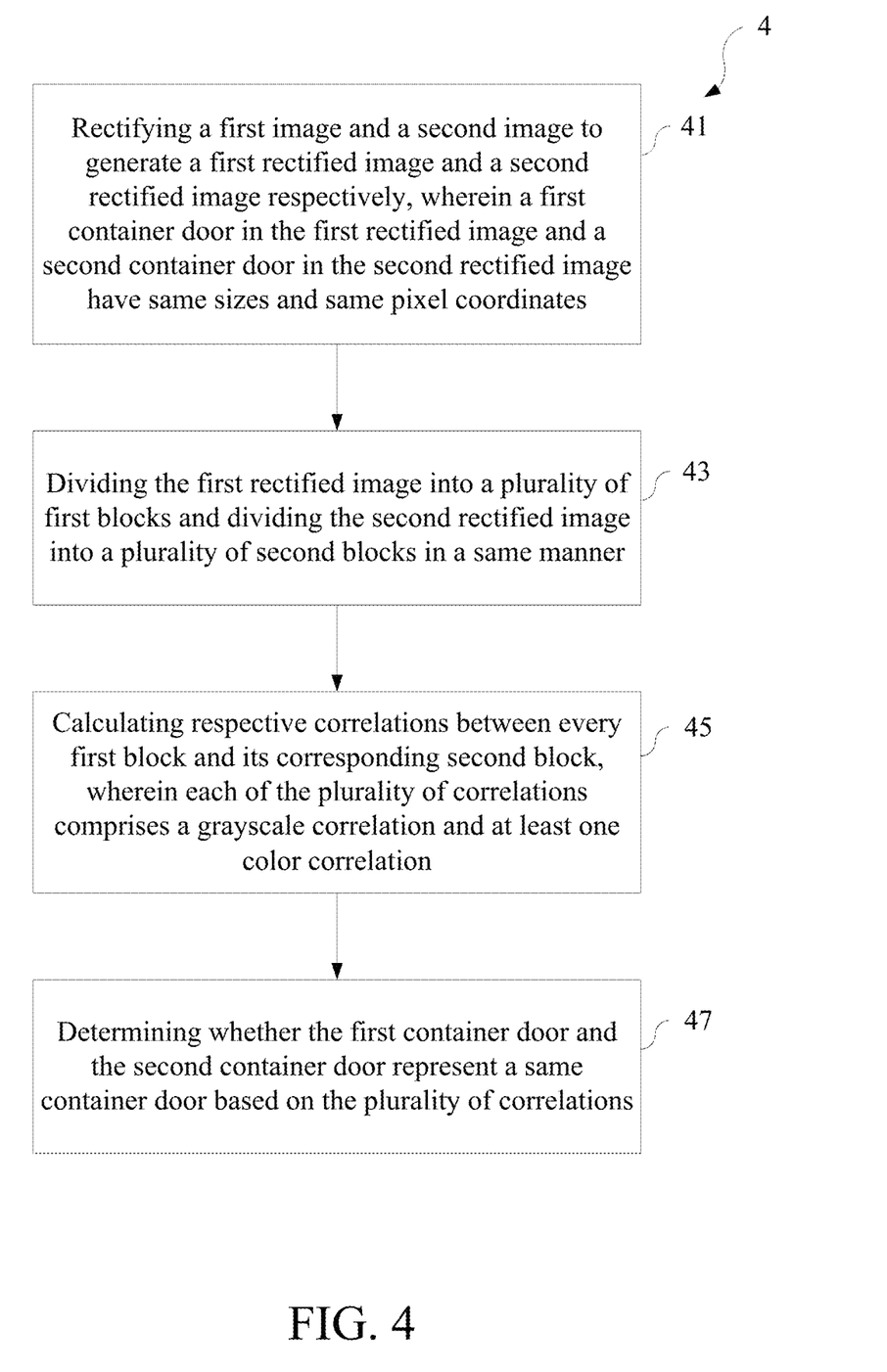
FIG. 4 illustrates an image analysis method according to some embodiments of the present invention.

FIG. 4 illustrates an image analysis method according to some embodiments of the present invention. The content of FIG. 4 is shown only for the purpose of illustrating embodiments of the present invention and is not intended to limit the present invention.

Referring to FIG. 4, an image analysis method 4 performed by an image analysis apparatus may comprise the following steps: rectifying a first image and a second image to generate a first rectified image and a second rectified image respectively, wherein a first container door in the first rectified image and a second container door in the second rectified image have same sizes and same pixel coordinates (labeled as step 41); dividing the first rectified image into a plurality of first blocks and dividing the second rectified image into a plurality of second blocks in a same manner (labeled as step 43); calculating respective correlations between every first block and its corresponding second block, wherein each of the plurality of correlations comprises a grayscale correlation and at least one color correlation (labeled as step 45); and determining whether the first container door and the second container door represent a same container door based on the plurality of correlations (labeled as step 47).

The order of steps shown in FIG. 4 is not restricted, and can be adjusted in the cases where the image analysis method 4 can still be implemented.

In some embodiments, the step 47 may further comprise the following step: setting a correlation threshold for each of the plurality of first blocks, and comparing the plurality of correlations with the plurality of correlation thresholds respectively to determine whether the first container door and the second container door represent the same container door.

In some embodiments, the plurality of correlations mentioned above may belong to an YCbCr color space.

In some embodiments, the step 41 may further comprise the following steps: identifying edges of the first container door from the first image, and rectifying the first image according to the edges of the first container door; and identifying edges of the second container door from the second image, and rectifying the second image according to the edges of the second container door.

Every embodiment of the image analysis method 4 essentially correspond to a corresponding embodiment of the image analysis apparatus 1. Therefore, even if the above description does not specifically described all of the embodiments of the image analysis method 4 in detail, a person having ordinary skill in the art can still directly understand those according to the above description of the image analysis apparatus 1.

The above disclosure is related to the detailed technical contents and inventive features thereof for some embodiments of the present invention, but such disclosure is not to limit the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image analysis apparatus, comprising:
a storage, being configured to store a first image and a second image, wherein the first image comprises a first container door, and the second image comprises a second container door; and
a processor, being electrically connected to the storage and configured to:
rectify the first image and the second image to generate a first rectified image and a second rectified image respectively, wherein the first container door in the first rectified image and the second container door in the second rectified image have same sizes and same pixel coordinates;
divide the first rectified image into a plurality of first blocks and divide the second rectified image into a plurality of second blocks in a same manner;
calculate respective correlations between each of the plurality of first blocks of the first rectified image and one of the plurality of second blocks of the second rectified image that corresponds to the first block, wherein each of the plurality of correlations comprises a grayscale correlation and at least one color correlation; and
determine whether the first container door and the second container door represent a same container door based on the plurality of correlations.

2. The image analysis apparatus of claim 1, wherein the processor further sets a correlation threshold for each of the plurality of first blocks, and compares the plurality of correlations with the plurality of correlation thresholds respectively to determine whether the first container door and the second container door represent the same container door.

3. The image analysis apparatus of claim 1, wherein the plurality of correlations belongs to an YCbCr color space.

4. The image analysis apparatus of claim 1, wherein the processor is further configured to:
identify edges of the first container door from the first image, and rectify the first image according to the edges of the first container door; and
identify edges of the second container door from the second image, and rectify the second image according to the edges of the second container door.

5. An image analysis method performed by an image analysis apparatus, comprising:
rectifying a first image and a second image to generate a first rectified image and a second rectified image respectively, wherein a first container door in the first rectified image and a second container door in the second rectified image have same sizes and same pixel coordinates;
dividing the first rectified image into a plurality of first blocks and dividing the second rectified image into a plurality of second blocks in a same manner;
calculating respective correlations between each of the plurality of first blocks of the first rectified image and one of the plurality of second blocks of the second rectified image that corresponds to the first block, wherein each of the plurality of correlations comprises a grayscale correlation and at least one color correlation; and
determining whether the first container door and the second container door represent a same container door based on the plurality of correlations.

6. The image analysis method of claim 5, wherein the step of determining whether the first container door and the second container door represent the same container door further comprises: setting a correlation threshold for each of the plurality of first blocks, and comparing the plurality of correlations with the plurality of correlation thresholds respectively to determine whether the first container door and the second container door represent the same container door.

7. The image analysis method of claim 5, wherein the plurality of correlations belongs to an YCbCr color space.

8. The image analysis method of claim 5, wherein the step of rectifying the first image and the second image further comprises:
identifying edges of the first container door from the first image, and rectifying the first image according to the edges of the first container door; and
identifying edges of the second container door from the second image, and rectifying the second image according to the edges of the second container door.

* * * * *